(12) United States Patent
Farrar et al.

(10) Patent No.: US 9,047,330 B2
(45) Date of Patent: Jun. 2, 2015

(54) INDEX COMPRESSION IN DATABASES

(75) Inventors: Daniel James Farrar, Ontario (CA);
Peter Bumbulis, Ontario (CA); Nathan Michael Auch, Ontario (CA)

(73) Assignee: IANYWHERE SOLUTIONS, INC., Dublin, CA (US)

( * ) Notice: Subject to any disclaimer, the term of this patent is extended or adjusted under 35 U.S.C. 154(b) by 531 days.

(21) Appl. No.: 12/258,861

(22) Filed: Oct. 27, 2008

(65) Prior Publication Data
US 2010/0114843 A1    May 6, 2010

(51) Int. Cl.
*G06F 7/00*         (2006.01)
*G06F 17/30*        (2006.01)

(52) U.S. Cl.
CPC ...... *G06F 17/30336* (2013.01); *G06F 17/3033* (2013.01); *G06F 17/30327* (2013.01); *G06F 17/30949* (2013.01); *G06F 17/30955* (2013.01)

(58) Field of Classification Search
CPC .......... G06F 17/30327; G06F 17/3033; G06F 17/30336; G06F 17/30949; G06F 17/30955
USPC .................. 726/26; 713/193; 707/797, 803
See application file for complete search history.

(56) References Cited

U.S. PATENT DOCUMENTS

| | | | | |
|---|---|---|---|---|
| 5,918,225 A * | 6/1999 | White et al. | ............. | 1/1 |
| 7,448,047 B2 * | 11/2008 | Poole et al. | ............. | 719/316 |
| 2003/0135495 A1 * | 7/2003 | Vagnozzi | ............. | 707/3 |
| 2004/0015478 A1 * | 1/2004 | Pauly | ............. | 707/1 |
| 2005/0246717 A1 * | 11/2005 | Poole et al. | ............. | 719/316 |
| 2005/0262110 A1 * | 11/2005 | Gu et al. | ............. | 707/100 |
| 2006/0123249 A1 * | 6/2006 | Maheshwari et al. | ........ | 713/193 |
| 2008/0104102 A1 * | 5/2008 | Zhang | ............. | 707/102 |

FOREIGN PATENT DOCUMENTS

EP         1058197  A2    12/2000

OTHER PUBLICATIONS

Notification of Transmittal of the International Search Report and Written Opinion, dated Jun. 8, 2010, for PCT Application No. PCT/US2009/062053, 11 pages.

(Continued)

*Primary Examiner* — Hosain Alam
*Assistant Examiner* — Navneet K Gmahl
(74) *Attorney, Agent, or Firm* — Sterne, Kessler, Goldstein & Fox P.L.L.C.

(57) ABSTRACT

Systems, methods and computer program products for compression of database indexes are described herein. A system embodiment includes a sequence determiner to scan a database index and to determine a start of a range and end of a range of consistently changing values in one or more index pages of said database index and an index updater to update said database index based on a sequence determined by said sequence determiner, while suspending writing of one or more values that lie within start of said range and end of said range of values. A method embodiment includes scanning an index, determining a pattern of changing values in one or more index pages of said index and selectively updating said index based on said determining step to minimize index insertions. The method embodiment further includes determining a start of a range of values and an end of said range of values in an index page, setting appropriate bits to identify said start of range of values and end of range of values, determining if an entry to be inserted can appended to at the end of said range of values, and compressing said index by suspending writing of one or more values that occur between said start of range of values and said end of range of values.

20 Claims, 7 Drawing Sheets

(56) References Cited

OTHER PUBLICATIONS

Supplementary European Search Report for European Application No. 09829567, dated Dec. 5, 2013, 14 pages.

Goldstein, et al., "Compressing Relations and Indexes," 1998 Proceedings of the Fourteenth International Conference on Data Engineering, Feb. 23-27, 1998, 10 pages.

* cited by examiner

| Index Key(s) 310 | Row Identifiers (RIDs) 320 |
|---|---|
| ... | ... |
| 7254 (singleton) | Page 102 Slot 42 |
| 7255 (range_start) | Page 107 Slot 17 |
| 7260 (range_end) | Page 107 Slot 22 |
| 7261 (range_start) | Page 108 Slot 4 |
| ... | ... |

FIG. 3C

INDEX COMPRESSION IN DATABASES

BACKGROUND OF THE INVENTION

1. Field of the Invention

The present invention relates to databases, and more particularly to indexes associated with databases.

2. Background Art

Database systems generally provide indexes to increase the speed of the data retrieval process. A database index is conceptually similar to an index found at the end of a book, in that both kinds of indexes comprise an ordered list of information accompanied with a location of the information. Values in one or more columns of a table are stored in an index, which is typically maintained separately from the actual database table (or the underlying base table). The ordered list of information in an index allows for quick scanning to find a target value or range of values. Moreover, since a conventional index stores only the values from one or more columns that serve as the key to the index, a pointer and a unique row identifier if necessary, the number of blocks of data being read into memory is significantly reduced as compared to a fall table scan which would be a needed if an index were not used.

To save storage space needed to store an index and to reduce the amount of data transfer involved in query processing, different compression techniques may be used to compress indexes. Different types of index compression techniques include techniques that employ variable length coding or fixed-length index key compression. Although these compression techniques may help in conserving some disk space, they require separate phases of compression and decompression. As a consequence, for improved cache utilization and faster disk-to-memory transfer, decompression speeds must be high. Furthermore, since separate compression and decompression phases require re-writing of an index, existing index compression methods become computationally intensive.

Therefore, what is needed is a system, method and computer program product that compresses indexes in a manner that overcomes limitations of existing index compression techniques.

BRIEF SUMMARY

Briefly stated, the invention includes system, method, computer program product embodiments and combinations and sub-combinations thereof for compression of database indexes. In an embodiment, a sequence determiner scans a database index page to determine if values of index keys and row identifiers change in a consistent manner. An index updater then uses this determination to mark a start and an end of the range of consistently changing index keys and identifiers, while the index is being populated, without entering intermediate values that lie within that range.

In this way, index compression can be achieved while an index is being populated. Furthermore, index compression achieved using embodiments of the present invention may be computationally less intensive.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 3C illustrates different identifiers in an index page, according to an embodiment of the invention.

Figure 1:
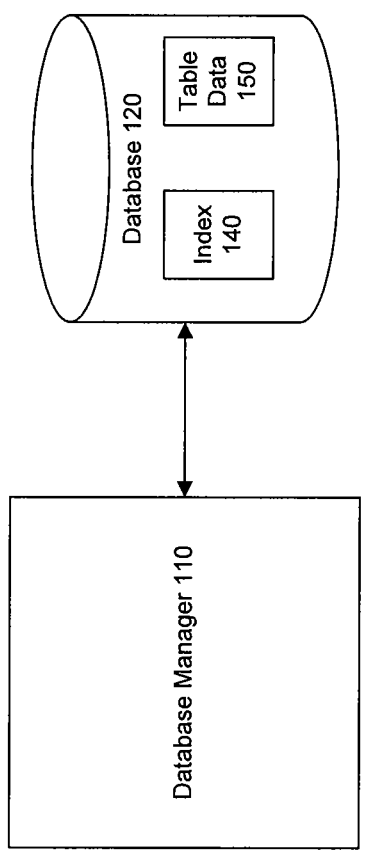
FIG. 1 is a diagram of a system for index compression, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to systems, methods and computer program products for compression of database indexes. In an embodiment, a sequence determiner scans a database index page to determine if values of index keys and row identifiers change in a consistent manner. An index updater then uses this determination to mark a start and an end of the range of consistently changing index keys and identifiers, while the index is being populated, without entering intermediate values that lie within that range.

In this way, index compression can be achieved while an index is being populated. Furthermore, index compression achieved using embodiments of the present invention may be computationally less intensive.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

System

FIG. 1 illustrates system 100 which is a general system architecture for compression of database indexes, according to an embodiment of the invention. (While the following is described in terms of databases and database indexes, the invention is not limited to this embodiment. The invention is applicable to any system having generally the structure of FIG. 1, or that would benefit from the functions as described herein.)

System 100 includes database manager 110 and database 120. Database 120 can further include index 140 and table data 150.

Database manager 110 can be any form of database management system (DBMS) and can include, but is not limited to, a device having a processor and memory for executing and storing instructions. In an example, not intended to limit the invention, database manager 110 may be a DBMS such as SYBASE Adaptive Sever Enterprise®. Database manager 110 may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

Database manager 110 may store and manipulate data in database 120. In an embodiment, database manager 110 provides software routines for manipulating data in database 120. Database manager 110 may be used directly by system users, as a component of a software package or to can be used to provide various services to an independent software package.

Database 120 may be a collection of data which is managed and manipulated by database manager 110 according to various logical data models, or views of stored data, as known to those skilled in the art. Examples of logical data models in the present database market include the relational model, using the industry-standard SQL query language. As an example, manipulating data in a relational architecture system includes manipulation of tables, shared columns and indexes that may reside in database 120.

Database 120 may further include index 140 and table data 150. Table data 150 may include one or more database tables. Database tables are known to those of skilled in the art and may further include several records, each record composed of several fields.

Index 140 can provide a fast and efficient means of finding data rows in table data 150. In an embodiment, index 140 is implemented as a collection of index pages. As an example, each index page includes one or more pairs of data. Each pair includes an index key and associated data. Associated data may include a pointer, in the form of a row identifier (RID), to where the row with a certain index key value physically resides in a table in table data 150. As an example, a RID can be used by database manager 110 to locate a row in a table data 150.

In an embodiment, not intended to limit the invention, index 140 is implemented as a B-tree index that includes different types of index pages which are nodes of the B-tree. In another embodiment, index 140 is implemented as any variant of a B-tree index or any other form of data-structure known to those skilled in the art. B-tree indexes are known to those skilled in the art and may include one root node, two or more branch nodes and a plurality of leaf nodes. As an example, a root node includes node pointers to branch nodes, branch node includes pointers to leaf nodes or other branch nodes and a leaf node includes index key values and in some cases, horizontal pointers to other leaf nodes.

Figure 3A:
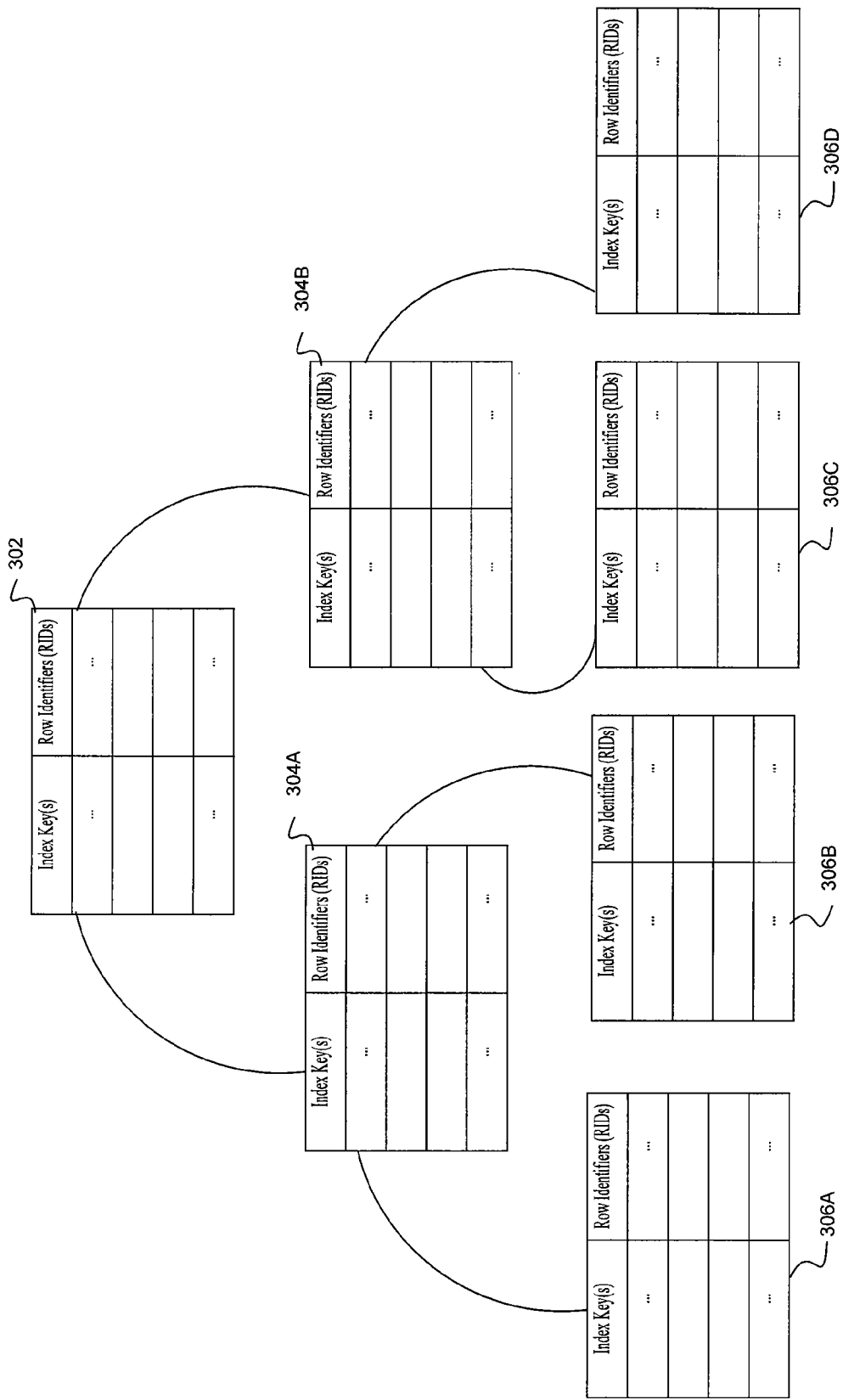
FIG. 3A illustrates an exemplary index, according to an embodiment of the invention.

FIG. 3A illustrates an exemplary B-tree index illustrating, root node 302, branch nodes 304A-B and leaf nodes 306A-D. As illustrated in FIG. 3A, each index page or node of the B-tree further includes index keys and RIDs. This example is illustrative and is not intended to limit the invention.

As an example, when database manager 110 creates index 140 for table data 150, database manager 110 may initially allocate a single index page. This page represents a root node and may remain empty until database manager 110 inserts data into table data 150. At first, a root node functions in the same way as a leaf node. For each row that is inserted into table data by database manager 110, database manager 110 creates and inserts an index key in the root node.

When the root node becomes full of index keys, database manger 110 may split the root node by creating two leaf nodes and by relocating some of the root-node entries to each of the newly created leaf nodes. As new rows are added to table data 150 by database manager 110, database manager 110 adds index keys to the leaf nodes. When a leaf node fills, database manager 110 may create a new leaf node, and moves part of the contents of the full index node to the new node, and may add a 'node pointer' to the new leaf node in the root node.

The above described structure and method of generation of a B-tree is exemplary and is not intended to limit the invention.

Figure 2:
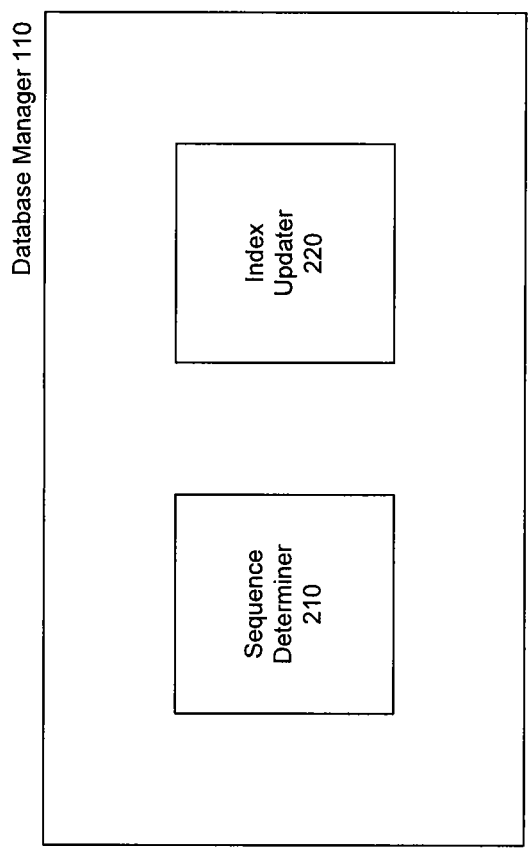
FIG. 2 illustrates a database manager, according to an embodiment of the invention.

FIG. 2 illustrates database manager 110 in greater detail, according to an embodiment of the invention. As shown in FIG. 2 database manager 110 further includes sequence determiner 210 and index updater 220. In an embodiment, sequence determiner 210 determines consistently changing values of index keys in an index page associated with index 140. Index updater 220 updates index 140 based on a sequence determined by sequence determiner 210. Sequence determiner 210 and index updater 220 are described further below.

Determination of a Sequence by Sequence Determiner 210

Figure 3B:
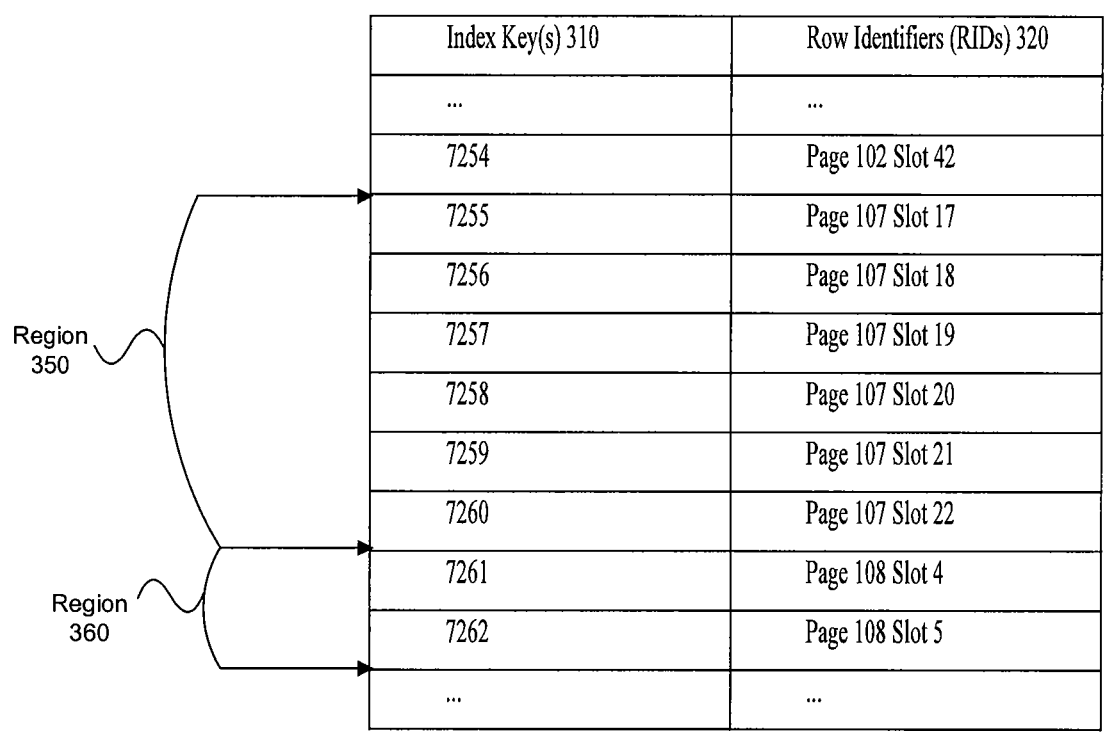
FIG. 3B illustrates an exemplary leaf node index page, according to an embodiment of the invention.

FIG. 3B illustrates an exemplary index leaf page at a logical level within a B-tree index, according to an embodiment of the invention.

The example index page illustrated in FIG. 3B includes index key(s) 310 and row identifier(s) (RIDs) 320 for a portion of an index leaf page.

Referring to exemplary FIG. 3B, it can be seen that both the index keys 310 and the RIDs 320 increase in a consistent manner in region 350. For example, index keys 310 increase consistently by a value of 1, beginning at a value of '7255' till a value of '7260' is reached. RIDs corresponding to index keys within region 350 also increase consistently by a value of 1 beginning at a value of 'Page 107 Slot 17' and ending at a value of 'Page 107 Slot 22' within region 350. Region 360 is another region adjacent to region 350 where index keys 310 and RIDs 320 increase similarly in consistent manner. It is to be noted that prior to region 350, an index key value of '7254' exists that corresponds to a RID 'Page 102 Slot 42'. This index key value is not included, for example, in region 350 as it does not correspond to the beginning of a consistently changing (e.g. increasing or decreasing) range. This is because the value of the RID directly after 'Page 102 Slot 42' is 'Page 107 Slot 17'. This is associated with a change of (42-17) slots or 25 slots which is different from the consistent increase of 1 in region 350 described earlier. Although the example, illustrated in FIG. 3B, shows consistently changing values that increment by a value of '1', it is to be appreciated that values that are consistently changing are not limited to an increment of '1', but can increment or decrement by any positive or negative value (e.g. −2, 1, 5, 11.5, etc.). In another example, not intended to limit the invention, RIDs in a range are sequential. Values, for example, may follow any arithmetic sequence and embodiments of the invention may operate on a hash of the value(s).

In an embodiment, sequence determiner 210 determines consistently changing values of both the index keys and RIDs in an index page. Sequence determiner 210 also determines values of index keys and RIDs that do not lie in a consistently changing range. Such values that do not lie within a range may be termed as 'singletons'. Referring to the exemplary index leaf page illustrated in FIG. 3B, sequence determiner 210 determines the singleton value '7254' and its corresponding RID 'Page 102 Slot 42' is a singleton.

In an embodiment, when an index is being populated, index updater 220 identifies a location in the index where a RID is to be inserted and sequence determiner 210 checks the surrounding RIDs within that index page to determine if they are changing in a consistent manner (e.g. RIDs are incrementing in a consistent manner). Index updater 220 then avoids inserting an index key and its corresponding RID if it lies within a range of consistently changing entries while the index is being populated, effectively compressing index 140. If an index key and its corresponding RID cannot be inserted in a manner that lies within a range of consistently changing values it is identified to be a 'singleton'. This operation is described further below with respect to FIG. 3C.

Updating an Index Using Index Updater 220

FIG. 3C illustrates an exemplary index page in FIG. 3B updated by index updater 220. As illustrated in FIG. 3C, index updater 220 may explicitly mark singletons, start of a range and end of a range based on input from sequence determiner 210. Furthermore, index updater 220 determines that it is not necessary to insert an index key and its corresponding RID if it lies adjacent to a range of consistently changing entries while the index is being populated. In this case, it is not necessary to insert an index key and its corresponding RID as it can be determined or calculated, as described herein. In FIG. 3C, intermediate index key values '7256' through '7259' and their respective RIDs, have not been inserted into the index page by index updater 220 as they lie within a consistently changing range bound by index key values '7255' and '7260'. As illustrated in FIG. 3C, index keys '7254', '7255', '7260' and '7261' have been explicitly marked as a 'singleton', 'range_start', 'range_end' and 'range_start' respectively in the column associated with index keys 320. As described earlier with reference to FIG. 3B, '7255' is associated with the start of a range of consistently increasing values and '7260' is associated with the end of a range of consistently increasing values that begin at '7255'.

Although FIG. 3C illustrates the identifiers as 'singleton', 'range_start' and 'range_end', these identifiers may be implemented as 'flags' which can be used by database manager 110 to determine if there are any missing entries (i.e. index keys and RIDs) between a 'range_start' identifier and a 'range_end' identifier in an index page when index 140 is being read by database manager 110. In an embodiment, the 'singleton, 'range_start' and 'range_end' identifiers are implemented as flags that comprise one or more bits. These bits may be adjacent to an index key. As an example, a sequence of these bits indicates the start of a range and another sequence of the same bits indicates the end of a range. These bits could occur within a structure that stores an index key or embedded within one or more bits that comprise an index key.

Referring to FIG. 3C, in an embodiment, each of the 'singleton', 'range_start' and 'range_end' identifiers occupy the same number of bits. For example, if each index key entry is 8 bytes long, 2 bits within the 8 bytes may be reserved for 'singleton', 'range_start' and 'range_end' identifiers. Index updater 220 then modifies these 2 bits to mark a 'singleton', 'range_start' and 'range_end' index key value.

In this way, index updater 220 may use input from sequence determiner 210 to mark a start of a range and an end of the range in addition to marking values that do not lie in any range of consistently changing values (e.g. singletons).

Retrieving Values From a Compressed Index Page

In general terms, consider the value of an index key 'x' to be 'VAL(x)' and the RID of an index key 'x' to be 'RID(x)'. Let 'VAL(given)' be the value of a given index key. Assume that the given index entry has already been determined to lie in compressed range between entries range_start and range_end. In order to determine "RID(given)", which is the RID stored in the index for value VAL(given), let $$\text{range\_size} = \text{RID(range\_end)} - \text{RID(range\_start)}$$

Then the value of an increment, val_increment can be obtained as:

$$\text{val\_increment} = (\text{VAL(range\_end)} - \text{VAL(range\_start)}) / \text{range-size}$$

Additionally, the position of 'VAL(given)' can be obtained as:

$$\text{position} = (\text{VAL(given)} - \text{VAL(range\_start)}) / \text{val\_increment}$$

Using these values, RID(given) can be obtained as:

$$\text{RID(given)} = \text{RID(range\_start)} + \text{position}$$

Referring to FIG. 3C, if database management system 110 is attempting to retrieve a row corresponding to index key value '7259', it scans index 140 and using 'range_start' and 'range_end' identifiers, it is able to identify that the index key value of '7259' is within the range [7255,7260].

In this example, RID(range_end) is 22, RID(range_start) is 17, VAL(range_end) is 7260, VAL(range_start) is 7255 and VAL(given) is 7259.

Now, using the exemplary generalized equations described above, values of "range_size", "val_increment" and "position" are determined as follows:

$$\text{range\_size} = \text{RID(range\_end)} - \text{RID(range\_start)} = 22 - 17 = 5$$

$$\text{val\_increment} = (\text{VAL(range\_end)} - \text{VAL(range\_start)}) / \text{range\_size} = (7260 - 7255)/5 = 1$$

$$\text{position} = (\text{VAL(given)} - \text{VAL(range\_start)}) / \text{val\_increment} = (7259 - 7255)/1 = 4$$

Thus, $\text{RID(given)} = \text{RID(range\_start)} + \text{position} = 17 + 4 = 21$ In this way, database management system 110 is able to retrieve a RID of '21' corresponding to a given index key value of '7259'. It is to be appreciated that this example is purely illustrative and is not intended to limit the invention.

Furthermore, consider that the index entries are represented by (v,[p,s]) where 'v' is the value of the index entry, and [p,s] is a RID (Page p, Slot s). In an embodiment, and as described earlier, if an index page has the entries (v+0,[p,s+0]), (v+k,[p,s+1]), (v+2k,[p,s+2]), (v+3k,[p,s+3]), . . . (v+nk,[p,s+n]), index updater 220 can replace these values with the endpoints (i.e. the start of the range and the end of the range) (v+0,[p,s+0]), (v+nk,[p,s+nk]), effectively compressing the index as intermediate index key values as not entered into the index page. In an embodiment, a flag (e.g. range_end) can be appended to the entry where the range ends ((v+nk,[p,s+nk])). As described earlier, bit within an index key value can be used as a flag to avoid an increase in the size of index 140.

In another embodiment, index key values may be duplicated by index updater 220 consecutively on an index page. This distribution of keys can then still be compressed by using methods described earlier with k=0. This allows these index key values to be made unique in a non-unique index allowing index updater 220 to compress the index using the methods described earlier.

Although embodiments of the invention allow the index to be compressed using range_start and range_end identifiers, embodiments also allow database manager 110 to return index 140 to an uncompressed or an initial state.

In cases, where there are often sequentially increasing key values that point to rows that are contiguous on their pages, high compression factors may be achieved using embodiments of the invention.

Index entries on leaf pages can be omitted because an index that is populated by index updater 220 needs to have only range_start(s), range_end(s) and singleton(s) identifiers appended to index key values. This approach effectively compresses the index even while it is being populated by index updater 220.

Index Insertion Using Inline Compression

Figure 4:
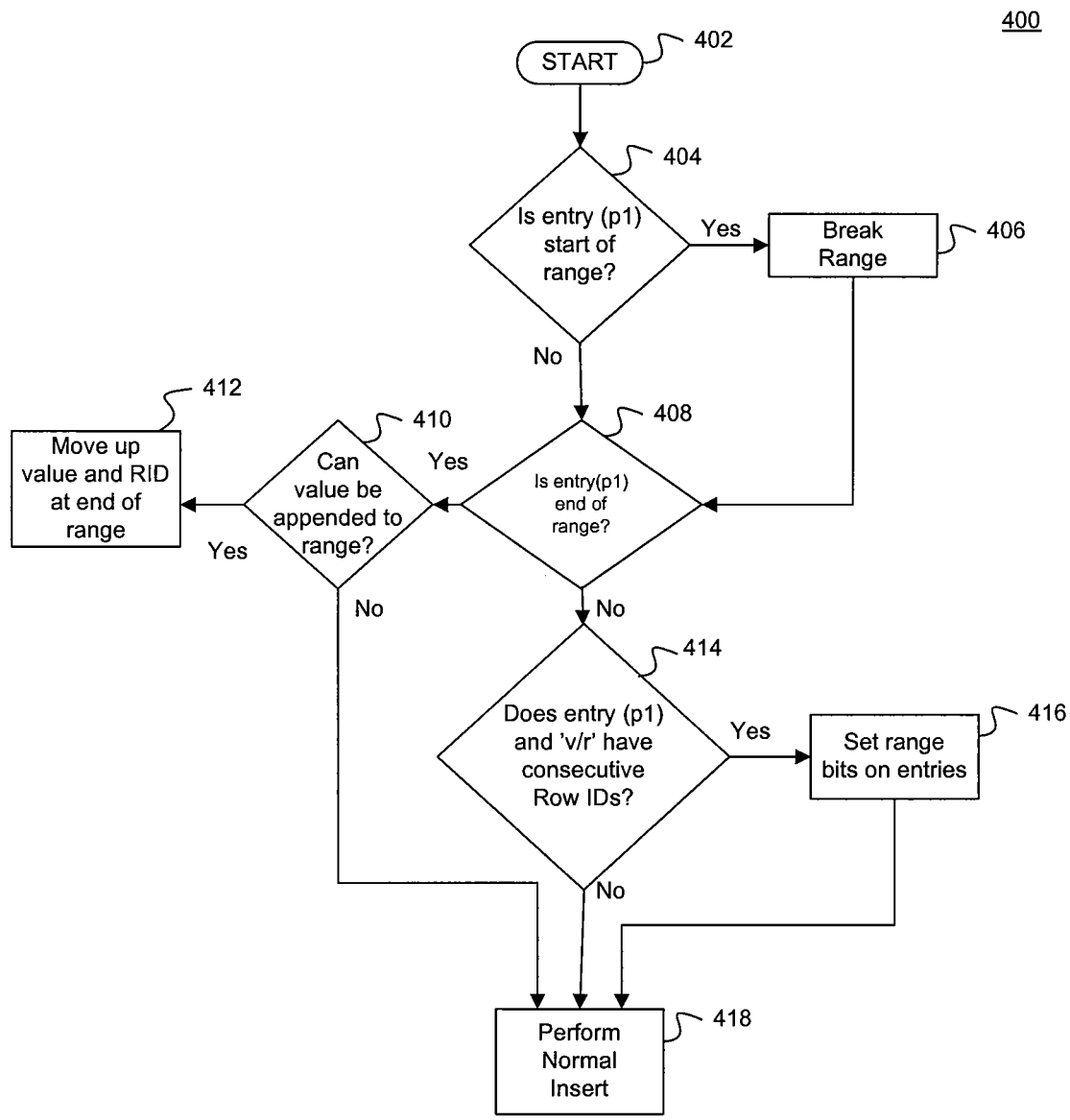
FIG. 4 is an exemplary flowchart illustrating index insertion using inline compression, according to an embodiment of the invention.

An exemplary method for index insertion using inline compression, according to an embodiment of the invention, will now be described in detail with reference to flowchart 400 in FIG. 4.

Let "v/r" be a the index key value/RID combination that is to be inserted into index 140. Prior to starting the insertion, a search is performed through the index 140 and position "p" is recorded at which the entry should be inserted. As part of this search, we also record the position of the entry prior to "p" i.e. "p1" and the position of the entry prior to "p1" i.e. "p2".

In step 402, method 400 begins and in step 404, sequence determiner 210 checks an index page (e.g. an index page in index 140) to see if entry (p1) is associated with a start of a range of consistently changing values.

If entry (p1) is associated with a start of a range (step 404), index updater 220 breaks the range into smaller ranges and/or singletons, materializing (decompressing) entries if required (step 406). Method 400 then proceeds to step 408.

Returning to step 404, if entry (p1) is not associated with a start of a range identifier, method 400 proceeds to step 408 where sequence determiner 210 checks if a entry (p) is associated with an end of a range identifier.

If a entry (p1) is associated with an end of a range identifier (step 408), sequence determiner 210 determines if an index key that is to be inserted can be appended to the end of the range (step 410). If the index key value can be appended to the end of the range (step 410), it is appended to the end of that range by moving up the value and RID that is currently at the end of the range (step 412). Otherwise, a normal (singleton) insert is performed where the index key value is inserted at location p (step 418).

Returning to step 408, if entry (p1) is not associated with a end of a range identifier, sequence determiner 210 checks if entry (p1) and 'v/r' have consecutive RIDs (step 414). If entry (p1) and v/r have consecutive RIDs, index updater 220 sets appropriate range bits in the entries to mark the start or the end of a range (step 416) and method 400 proceeds to step 418.

Returning to step 414, if entry (p1) and a 'v/r' do not have consecutive RIDs, index updater 220 performs a normal (singleton) insert operation at location 'p' (step 418).

In this way, the re-writing of index 140 at a different location is not needed in order to compress index 140.

Example Computer Embodiment

Figure 5:
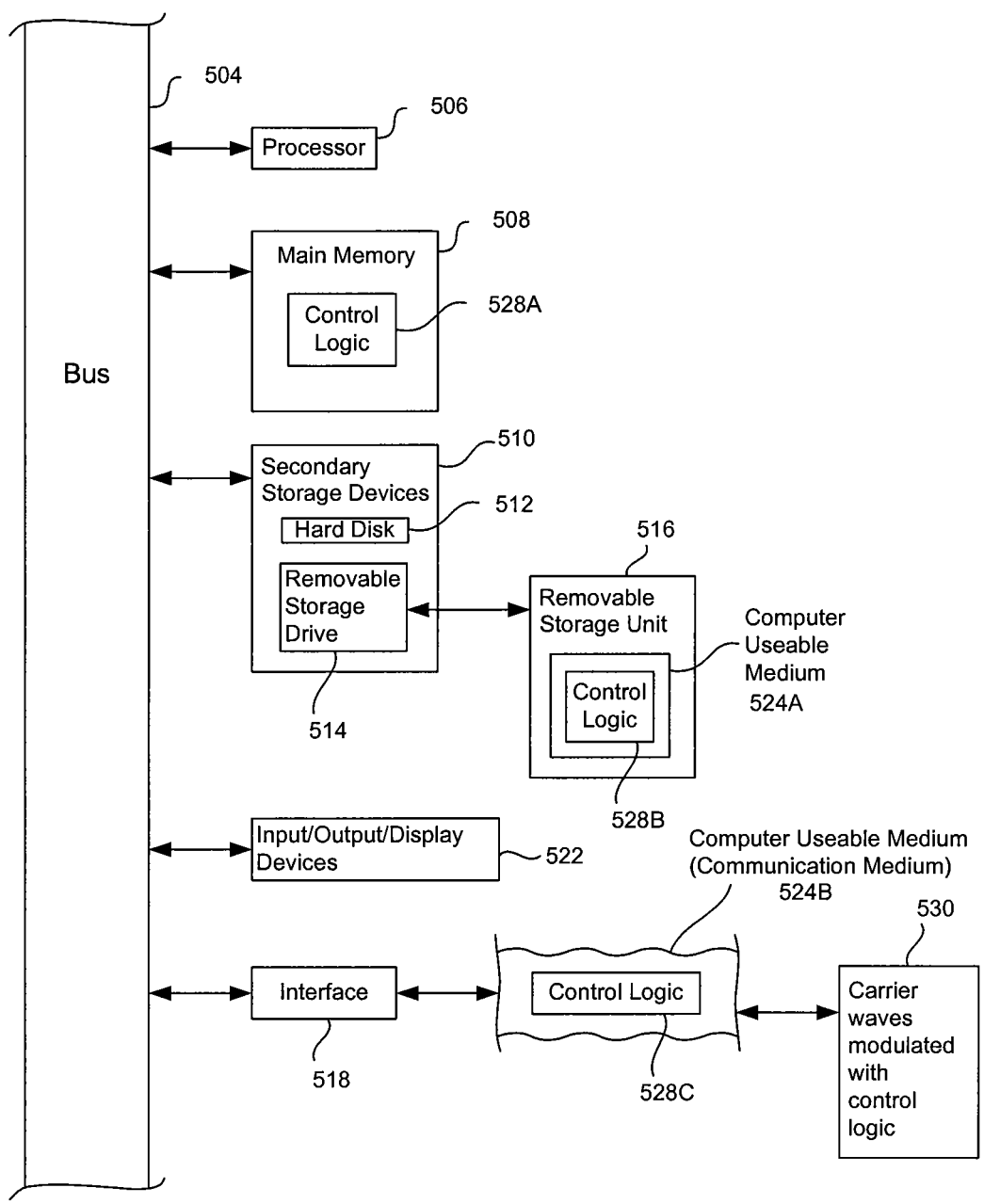
FIG. 5 illustrates an example computer useful for implementing components of embodiments of the invention.

In an embodiment of the present invention, the system and components of embodiments described herein are implemented using well known computers, such as example computer 502 shown in FIG. 5. For example, database manager 110 or database 120 can be implemented using computer(s) 502.

The computer 502 can be any commercially available and well known computer capable of performing the functions described herein, such as computers available from International Business Machines, Apple, Sun, HP, Dell, Compaq, Digital, Cray, etc.

The computer 502 includes one or more processors (also called central processing units, or CPUs), such as a processor 506. The processor 506 is connected to a communication bus 504.

The computer 502 also includes a main or primary memory 508, such as random access memory (RAM). The primary memory 508 has stored therein control logic 525A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any apparatus or manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for populating a database index, comprising:
identifying a location in a database index where a row identifier is to be inserted, said row identifier referencing a database row storing an index key value associated with said row identifier;
determining a pattern of consistently changing row identifiers in vicinity of said identified location prior to insertion of said row identifier and said index key value at said identified location in said database index, wherein said consistently changing row identifiers follow a consistent arithmetic sequence in response to a change of their corresponding index key values;
upon determination that said row identifier to be inserted is located within said pattern of consistently changing row identifiers, suspending inserting said row identifier and said index key value in said database index; and
upon determination that said row identifier to be inserted is located outside of said pattern of consistently changing row identifiers, inserting said row identifier and said index key value in said database index, based on said determined pattern of consistently changing row identifiers.

2. The method of claim 1, further comprising:
determining a start of a range of values and an end of said range of values in an index page of said database index;
setting appropriate bits to identify said start of said range of values and said end of said range of values in said index page;
determining if a value to be inserted into said index page can be appended to said end of said range of values; and
suspending writing of one or more values that occur between said start of said range of values and said end of said range of values.

3. The method of claim 1, further comprising identifying values that do not correspond to said pattern.

4. The method of claim 3, further comprising populating said index with a singleton identifier for an identified value that does not correspond to said pattern.

5. The method of claim 1, wherein said pattern comprises consistently increasing values.

6. The method of claim 2, further comprising:
retrieving a database table row corresponding to an index key value using said determined start of said range of values and said determined end of said range of values.

7. A processor-based system for populating a database index, comprising:
one or more processors;
a first module configured to identify a location in a database index where a row identifier is to be inserted, said row identifier referencing a database row storing an index key value associated with said row identifier;
a second module configured to determine a pattern of consistently changing row identifiers in vicinity of said identified location prior to insertion of said row identifier and said index key value at said identified location in said database index, wherein said consistently changing row identifiers follow a consistent arithmetic sequence in response to a change of their corresponding index key; and
a third module configured to:
upon determination that, said row identifier to be inserted is located within said pattern of consistently charging row identifiers, suspending inserting said row identifier and said index key value in said database index; and
upon determination that said row identifier to be inserted is located outside of said pattern of consistently changing row identifiers, inserting said row identifier and said index key value in said database index, based on said determined pattern of consistently changing row identifiers,
wherein said first module, said second module and said third module are implemented using the one or more processors.

8. The system of claim 7, wherein said database index comprises one or more index pages.

9. The system of claim 8, wherein each index page comprises one or more index keys and row identifiers associated with said index keys.

10. The system of claim 7, further comprising a fourth module configured to mark a start of a range of values and an end of said range of values in each said one or more index pages using start of range identifiers and end of range identifiers.

11. The system of claim 10, wherein said fourth module marks a value using a singleton identifier if said value does not lie within said start of said range of values and said end of said range of values.

12. The system of claim 10, wherein each said start of range identifiers and said end of range identifiers comprise one or more bits.

13. The system of claim 11, wherein said singleton identifier comprises one or more bits.

14. The system of claim 13, wherein said bits are included within index key values.

15. The system of claim 7, wherein said index is a B-tree index.

16. A computer program product including a non-transitory computer-readable medium having instructions stored thereon that, when executed by a computing device, cause the computing device to perform operations comprising:
identifying a location in a database index where a row identifier is to be inserted, said row identifier referencing a database row storing an index key value associated with said row identifier;
determining a pattern of consistently changing row identifiers in vicinity of said identified location prior to insertion of said row identifier and said index key value at said identified location in said database index, wherein said consistently changing row identifiers follow a consistent arithmetic sequence in response to a change of their corresponding index key values;

upon determination that said row identifier to be inserted is located within said pattern of consistently changing row identifiers, suspending inserting said row identifier and said index key value in said database index; and upon determination that said row identifier to be inserted is located outside of said pattern of consistently changing row identifiers, inserting said row identifier and said index key value in said database index, based on said determined pattern of consistently changing row identifiers.

17. The computer program product of claim 16, the operations further comprising:

determining a start of a range of values and an end of said range of values in an index page of said database index;

setting appropriate bits to identify said start of said range of values and said end of said range of values in said index page;

determining if a value to be inserted into said index page can be appended to said end of said range of values; and suspending writing of one or more values that occur between said start of said range of values and said end of said range of values.

18. The computer program product of claim 16, the operations further comprising identifying values that do not correspond to said pattern.

19. The computer program product of claim 18, the operations further comprising updating the index with a singleton identifier for an identified value that does not correspond to said pattern.

20. The computer program product of claim 17, the operations further comprising:

retrieving a database table row corresponding to an index key value using said determined start of said range of values and said determined end of said range of values.

* * * * *